United States Patent
Song

(10) Patent No.: US 12,344,313 B2
(45) Date of Patent: Jul. 1, 2025

(54) SIDE SILL REINFORCEMENT STRUCTURE OF VEHICLE

(71) Applicants: Hyundai Motor Company, Seoul (KR); Kia Corporation, Seoul (KR)

(72) Inventor: Won Jung Song, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 392 days.

(21) Appl. No.: 18/099,094

(22) Filed: Jan. 19, 2023

(65) Prior Publication Data
US 2024/0140533 A1     May 2, 2024

(30) Foreign Application Priority Data
Oct. 31, 2022   (KR) .................. 10-2022-0142043

(51) Int. Cl.
*B62D 25/02*   (2006.01)
*B62D 21/15*   (2006.01)
*B62D 27/02*   (2006.01)

(52) U.S. Cl.
CPC ......... *B62D 25/025* (2013.01); *B62D 21/152* (2013.01); *B62D 21/157* (2013.01); *B62D 27/023* (2013.01)

(58) Field of Classification Search
CPC .................. B62D 25/025; B62D 25/2036; B62D 27/023; B62D 21/157; B62D 21/152
USPC ...... 296/209, 187.12, 187.09, 187, 1, 29, 30
See application file for complete search history.

(56) References Cited

FOREIGN PATENT DOCUMENTS

| CN | 212950861 U | * | 4/2021 |
| CN | 216332325 U | * | 4/2022 |

OTHER PUBLICATIONS

CN212950861 Text (Year: 2021).*
CN216332325 Text (Year: 2022).*

* cited by examiner

*Primary Examiner* — Dennis H Pedder
(74) *Attorney, Agent, or Firm* — Slater Matsil, LLP

(57) ABSTRACT

An embodiment is a side sill reinforcement structure of a vehicle, the structure including a side sill including a side sill inner panel, a side sill outer panel, and a side sill reinforcement installed in a space between the side sill inner panel and the side sill outer panel to define a closed cross-section, an extrusion disposed inside the side sill, having a closed cross-section, and having a partition structure therein, and a plurality of connection brackets provided in plural inside the side sill to fix the extrusion, and defining a plurality of closed cross-sections together with the side sill and the extrusion.

18 Claims, 8 Drawing Sheets

[FIG. 1]
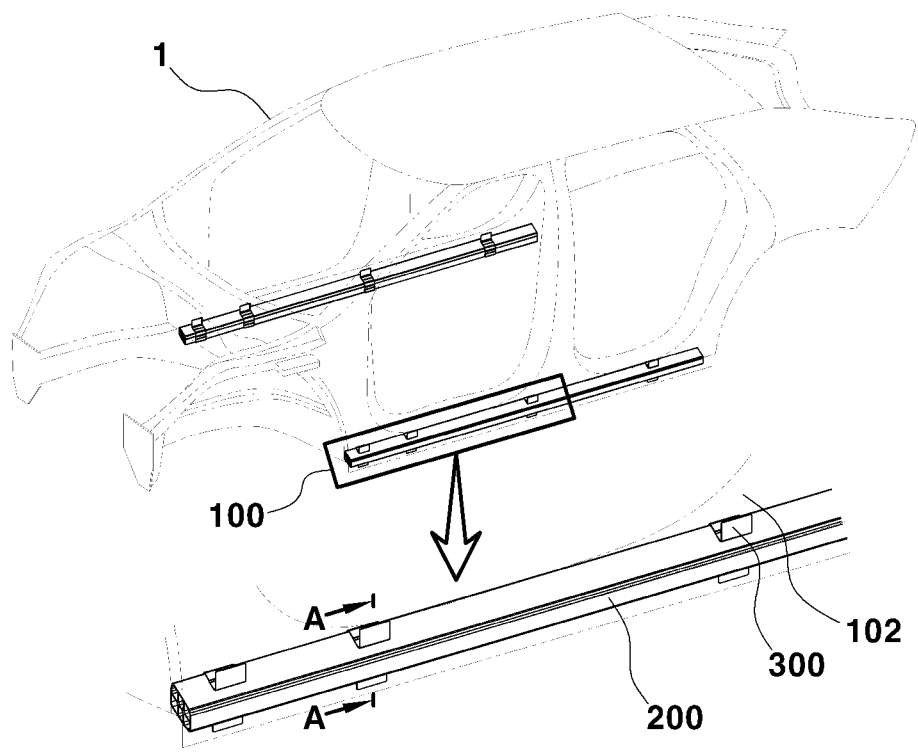

[FIG. 2]
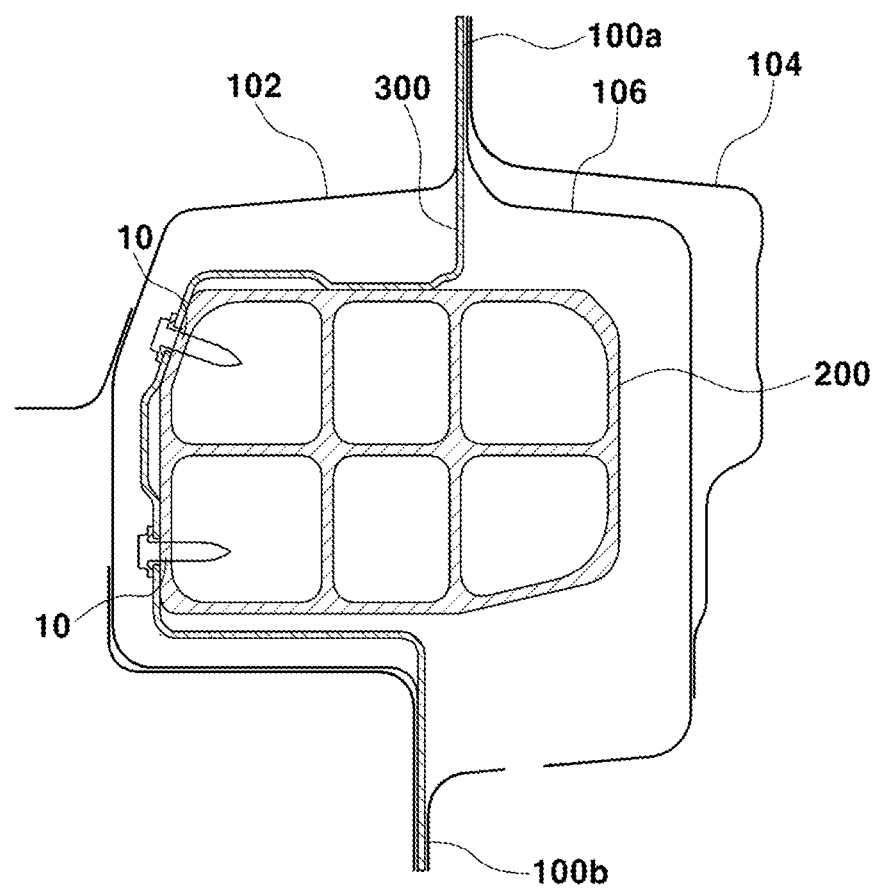

[FIG. 3]
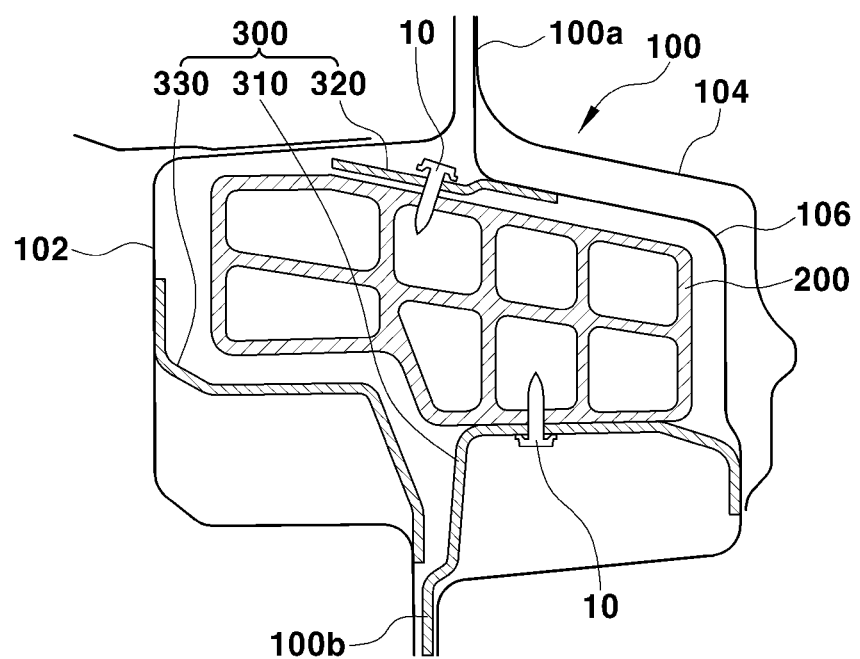

[FIG. 4]
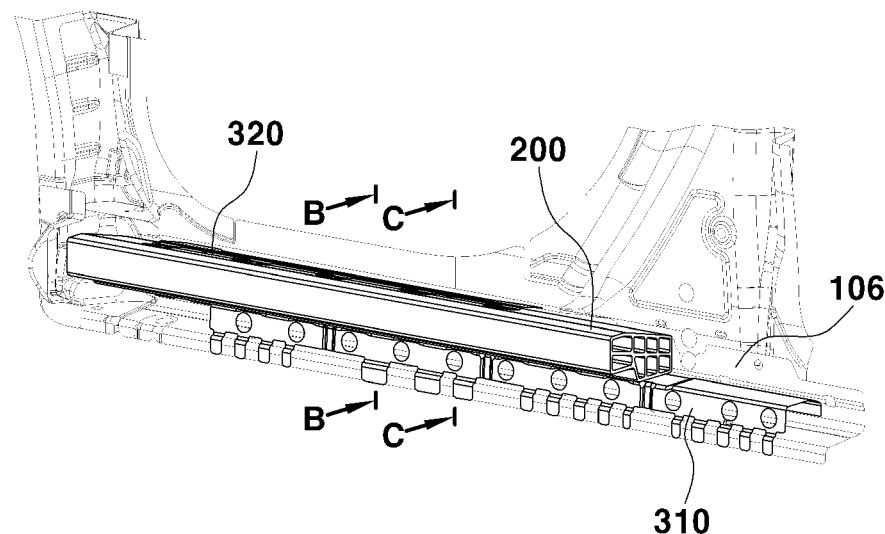
[FIG. 5]
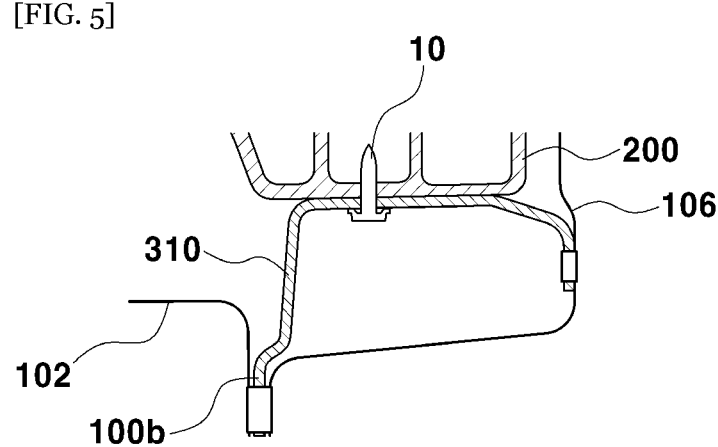

[FIG. 6]
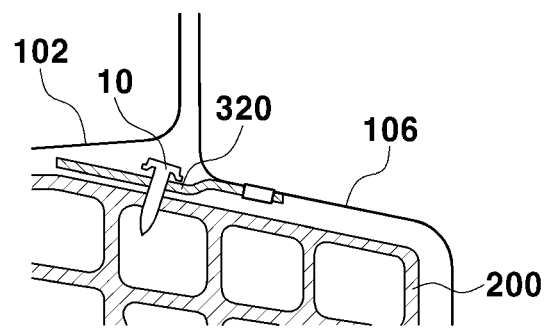
[FIG. 7]
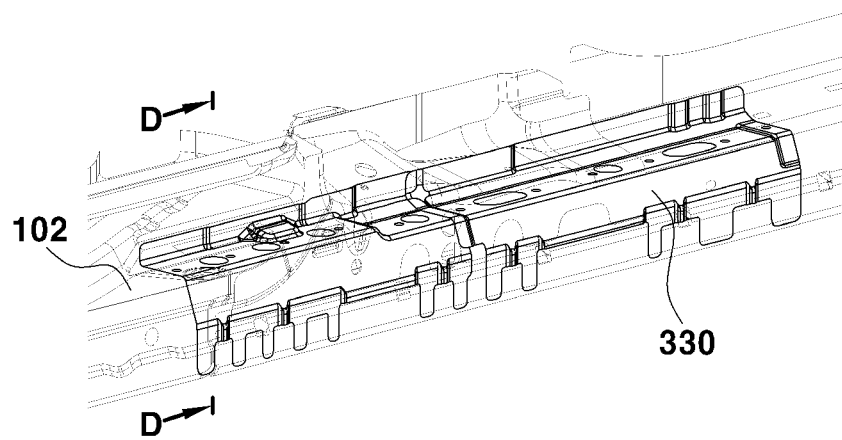

[FIG. 8]
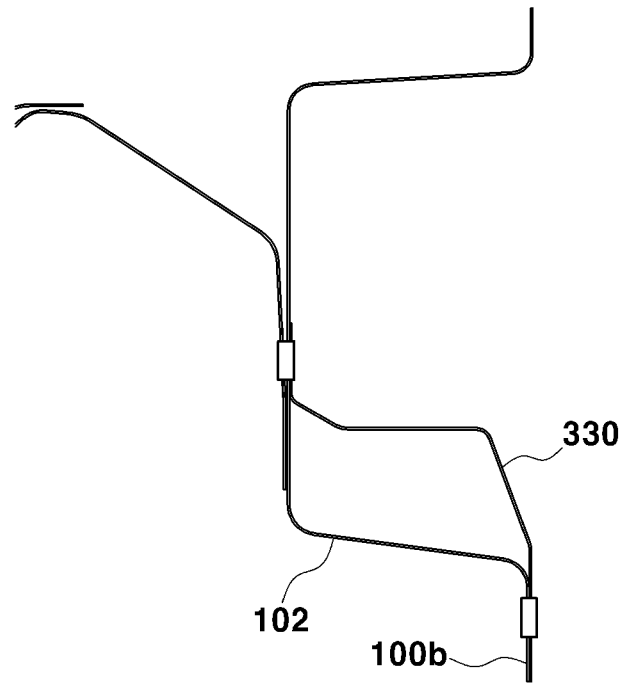
[FIG. 9A]
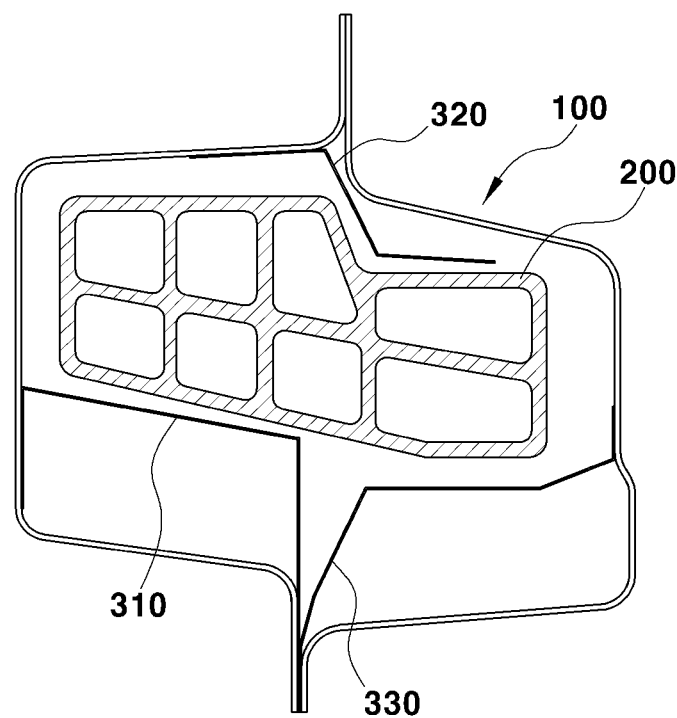

[FIG. 9B]
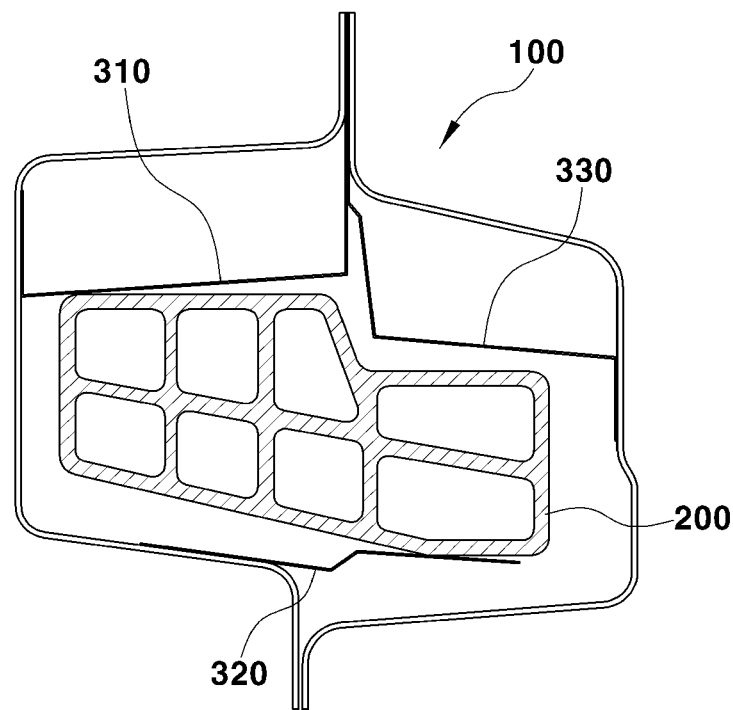
[FIG. 9C]
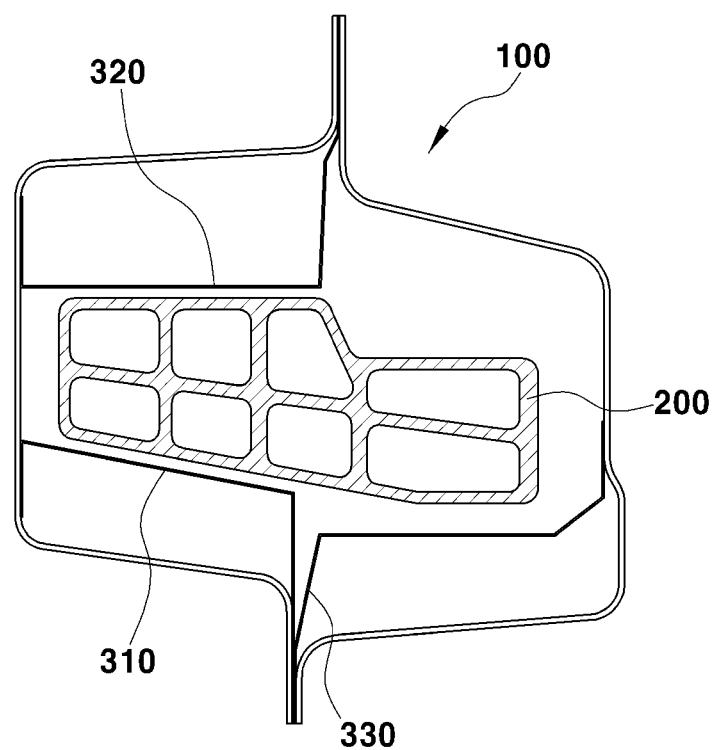

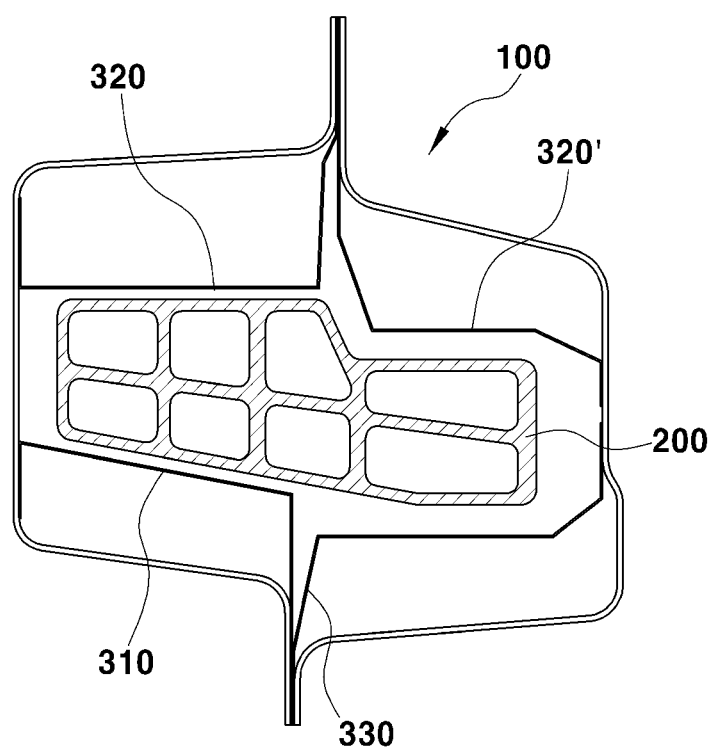
[FIG. 9D]

SIDE SILL REINFORCEMENT STRUCTURE OF VEHICLE

CROSS-REFERENCE TO RELATED APPLICATIONS

This application claims the benefit of Korean Patent Application No. 10-2022-0142043, filed on Oct. 31, 2022, which application is hereby incorporated herein by reference.

TECHNICAL FIELD

The present invention relates to a side sill reinforcement structure of a vehicle.

BACKGROUND

Recently, the electric vehicle (EV) market is rapidly growing, and accordingly, demand for increased range is increasing.

An early EV had a high-voltage battery located on the rear floor thereof for common use with an existing internal combustion engine vehicle. However, in the case of an EV-only platform vehicle that has recently been developed, a high-voltage battery with an increased size tends to be located at the bottom of the center floor thereof in order to increase range.

This is because, at the bottom of the center floor, an advantageous layout for increasing the size of the high-voltage battery is secured.

Such a high-voltage battery poses a fire hazard when damaged, and it is expected to be most vulnerable to side impact when located at the bottom of the center floor. In addition, because the distance from a power pole on a road becomes closer especially when the size of the high-voltage battery is increased to increase range, the high-voltage battery may be more dangerous in a side collision situation.

For this reason, in order to protect the high-voltage battery, a side sill needs to have a structure capable of minimizing deformation due to collision, and thus, in many vehicles, an extrusion made of aluminum is adopted in the inner portion of the side sill.

Because the extrusion described above is made of a material different from the side sill, spot welding, a general assembly method of connecting two components, cannot be applied. For this reason, a bracket is fastened to the extrusion, and then the bracket is fixed to the side sill by spot welding.

Here, the connectivity between the extrusion and the side sill is greatly influenced by the shape and rigidity of the bracket. When the connection is made only in a local area using a plurality of brackets, the extrusions may directly support the load to some extent in the event of side collision. However, in the case of frontal collision such as a small overlap, load is concentrated on the brackets, which may cause a problem in which the extrusion is separated inside the side sill.

The above information disclosed in this background section is only for enhancement of understanding of the background of the invention, and therefore it may contain information that does not form the prior art that is already known to a person of ordinary skill in the art.

SUMMARY

The present invention relates to a side sill reinforcement structure of a vehicle. More particularly, it relates to a side sill reinforcement structure of a vehicle capable of increasing the rigidity of a vehicle body and distributing the load on an extrusion in the event of collision.

The embodiments of the present invention has been made in an effort to solve the above-described problems associated with the prior art, and it is an object of the embodiments of the present invention to provide a side sill reinforcement structure of a vehicle, the structure having a plurality of connection brackets configured to fix an extrusion inside a side sill, wherein the plurality of connection brackets is mounted to partition the inner portion of the side sill to define a plurality of closed cross-sections inside the side sill together with the side sill, thereby increasing the rigidity of a vehicle body and distributing the load transmitted to the extrusion in the event of collision.

The object of the embodiments of the present invention is not limited to the object mentioned above, and other objects not mentioned herein will be clearly understood by those of ordinary skill in the art to which the embodiments of the present invention pertains (hereinafter, "those skilled in the art") based on the description below.

An embodiment of the present invention provides a side sill reinforcement structure of a vehicle, the structure including a side sill including a side sill inner panel, a side sill outer panel, and a side sill reinforcement installed in a space between the side sill inner panel and the side sill outer panel to define a closed cross-section, an extrusion disposed inside the side sill, having a closed cross-section, and having a partition structure therein, and a plurality of connection brackets provided in plural inside the side sill to fix the extrusion and defining a plurality of closed cross-sections inside the side sill together with the side sill and the extrusion.

In an embodiment, the plurality of connection brackets may include a first bracket connected to a lower flange, at which the side sill inner panel and the side sill reinforcement meet, and to the side sill reinforcement, and fastened to the lower portion of the extrusion, a second bracket connected to the side sill reinforcement and extending therefrom and fastened to the upper portion of the extrusion, and a third bracket connected to the lower flange and to the side sill inner panel and fixed inside the side sill inner panel.

In an embodiment, the first bracket may have a shape of '⊏', be fastened to the lower portion of the extrusion, and have one end connected to the lower flange and another end connected to the side sill reinforcement to define a closed cross-section.

In an embodiment, the third bracket may have at least one bent portion to be disposed independently of the extrusion, and may have one end connected to the lower flange and another end connected to the side sill inner panel to define a closed cross-section.

In an embodiment, due to reduction of the height of the extrusion, the second bracket may be deformable to additionally define at least one closed cross-section at a position corresponding to the first bracket or to the third bracket.

In an embodiment, the first to third brackets may correspond to the shape of the arrangement of the extrusion and may be selectively symmetrically moved in left and right or up and down directions to be connected in deformed shapes.

In an embodiment, the present invention provides a side sill reinforcement structure of a vehicle, the structure including a side sill including a side sill inner panel, a side sill outer panel, and a side sill reinforcement installed in a space between the side sill inner panel and the side sill outer panel to define a closed cross-section, an extrusion disposed inside the side sill, having a closed cross-section, and having a partition structure therein, and a plurality of connection brackets provided inside the side sill to fix the extrusion, and defining a plurality of closed cross-sections together with the side sill and the extrusion. Here, the plurality of connection brackets may have different shapes, may correspond to the shape of the arrangement of the extrusion, and may be selectively symmetrically moved in left and right or up and down directions to be connected in deformed shapes.

In an embodiment, the plurality of connection brackets may define at least two or more closed cross-sections, additionally.

Other aspects and embodiments of the invention are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings by way of illustration only, and thus are not limitative of the present invention, and wherein:

FIGS. 1 and 2 are views illustrating a related art side sill reinforcement structure of a vehicle;

FIG. 3 is a view schematically illustrating a side sill reinforcement structure of a vehicle according to an embodiment of the present invention;

FIGS. 4 and 5 are views illustrating a first bracket for a side sill reinforcement structure of a vehicle according to an embodiment of the present invention;

FIG. 6 is a view illustrating a second bracket for a side sill reinforcement structure of a vehicle according to an embodiment of the present invention;

FIGS. 7 and 8 are views illustrating a third bracket for a side sill reinforcement structure of a vehicle according to an embodiment of the present invention; and FIGS. 9A to 9D are views illustrating changes in a connection bracket for a side sill reinforcement structure of a vehicle according to an embodiment of the present invention.

It should be understood that the appended drawings are not necessarily to scale, presenting a somewhat simplified representation of various features illustrative of the basic principles of the invention. The specific design features of the embodiments of the present invention as disclosed herein, including, for example, specific dimensions, orientations, locations, and shapes, will be determined in part by the particular intended application and usage environment.

In the figures, the reference numbers refer to the same or equivalent parts of the embodiments of the present invention throughout the several figures of the drawing.

DETAILED DESCRIPTION OF ILLUSTRATIVE EMBODIMENTS

Description will now be given in detail according to embodiments disclosed herein, with reference to the accompanying drawings.

Advantages and features of the present invention, and a method of achieving the same, will be apparent with reference to the embodiments described below in detail in conjunction with the accompanying drawings.

However, the present invention may be embodied in many different forms, and should not be construed as being limited to the embodiments set forth herein. Rather, the embodiments are provided so that the present invention will be thorough and complete, and will fully convey the scope of the present invention to those skilled in the art. The present invention is defined only by the categories of the claims.

In describing the present disclosure, if a detailed explanation of a related known function or construction is considered to unnecessarily obscure the gist of the present disclosure, such explanation has been omitted but would be understood by those skilled in the art.

FIGS. 1 and 2 are views illustrating a related art side sill reinforcement structure of a vehicle, FIG. 3 is a view schematically illustrating a side sill reinforcement structure of a vehicle according to an embodiment of the present invention, and FIGS. 4 and 5 are views illustrating a first bracket for a side sill reinforcement structure of a vehicle according to an embodiment of the present invention.

FIG. 6 is a view illustrating a second bracket for a side sill reinforcement structure of a vehicle according to an embodiment of the present invention, FIGS. 7 and 8 are views illustrating a third bracket for a side sill reinforcement structure of a vehicle according to an embodiment of the present invention, and FIGS. 9A to 9D are views illustrating changes in a connection bracket for a side sill reinforcement structure of a vehicle according to an embodiment of the present invention.

Generally, a vehicle body 1 has a side surface including a side panel, a front door, and a rear door.

The vehicle body 1, as illustrated in FIG. 1, may have a structure in which a side sill 100 is provided at the lower portion of the side panel to maintain the rigidity of the lower portion of the side surface of the vehicle body 1.

In other words, in the case of an electric vehicle, because the size of a high-voltage battery increases to increase range, the high-voltage battery tends to be positioned at the bottom of the center floor of the vehicle body 1. For this reason, the high-voltage battery may be protected from external impact only when rigidity is secured for the lower portion of the side surface of the vehicle body 1.

To this end, a side sill 100 may include an extrusion 200 and a connection bracket 300, and may have a structure shown in the cross section A-A of FIG. 1 illustrated in FIG. 2.

More specifically, the side sill 100 includes, as illustrated in FIG. 2, a side sill inner panel 102 coupled in the longitudinal direction of the vehicle body 1 at each of opposite ends of the center floor, a side sill outer panel 104 coupled to the side sill inner panel 102 to define a closed cross-section having a box structure, and a side sill reinforcement 106 installed in a space between the side sill inner panel 102 and the side sill outer panel 104 and configured to attenuate impact.

In addition, the extrusion 200 is fastened and fixed inside the side sill 100 by the connection bracket 300 to define a closed cross-section and has a partition structure therein and, thereby, in the event of side collision on the vehicle body 1, supporting the side sill outer panel 104 deforming towards the side sill inner panel 102 and absorbing collision energy while deforming together with the side sill outer panel 104.

The connection bracket 300 has a shape bent into the shape of the extrusion 200, and serves to fix the position of the extrusion 200 inside the side sill 100.

Here, because the extrusion 200 is made of aluminum and the side sill 100 is made of steel, the extrusion 200 and the side sill 100 cannot be directly connected to each other by spot welding. For this reason, the connection bracket 300 made of steel is fastened to the extrusion 200 to fix the extrusion 200 inside the side sill 100. However, in the related art structure, a plurality of problems as follows occur (see FIG. 2).

First, because the connection bracket 300 is an individual structure and is connected to have a predetermined gap, the effect of reinforcing the rigidity of the vehicle is small.

Second, in fastening the connection bracket 300 to the extrusion 200, fastening members 10 are fastened to both the upper portion and the side portion of the extrusion 200, and thus the size of the extrusion 200 has to be reduced in order to secure a space for fastening the fastening member 10.

Third, because the extrusion 200 is connected only locally in the inside of the side sill 100 by the connection bracket 300 having a predetermined gap, when load is concentrated on the connection bracket 300 in the case of frontal collision such as a small overlap, separation may occur.

Fourth, because portions of the connection bracket 300 connected to an upper flange bow and to a lower flange mob each has a simple straight shape having a predetermined length, when the size of the extrusion 200 is reduced for cost and weight optimization, it may cause vibration and noise problems due to vibration of the extrusion 200 inside the side sill 100.

To solve these problems, a connection bracket 300 according to this embodiment, as illustrated in FIG. 3, fixes the position of an extrusion 200 inside a side sill 100, and is provided in plural to have different shapes to define a plurality of, more specifically, at least two closed cross-sections together with the side sill 100 and the extrusion 200 inside the side sill 100.

To this end, the connection bracket 300 includes a first bracket 310, a second bracket 320, and a third bracket 330.

The first bracket 310 extends in the longitudinal direction of a vehicle body 1, as illustrated in FIG. 4.

In addition, the first bracket 310, as in the structure of the cross section B-B of FIG. 4 illustrated in FIG. 5, is connected to a lower flange mob, at which a side sill inner panel 102 and a side sill reinforcement 106 meet, and to the side sill reinforcement 106, and is fastened to the lower portion of the extrusion 200 by a fastening member 10.

The first bracket 310 has a shape of 'E', is fastened to the lower portion of the extrusion 200, and has one end connected to the lower flange mob and another end connected to the side sill reinforcement 106 to define three closed cross-sections together with the side sill 100 and the extrusion 200.

The second bracket 320 extends in the longitudinal direction of the vehicle body 1, is connected to the upper portion of the side sill reinforcement 106 by welding, has a multi-step structure, and is fastened to the upper portion of the extrusion 200 by a fastening member 10, as in the structure of the cross section C-C of FIG. 4 illustrated in FIG. 6.

Because such a second bracket 320 does not have a simple straight shape as in the related art but has a multi-step structure and is connected and fastened in the horizontal direction, the fourth problem in the above-described related art structure may be solved.

As illustrated in FIG. 7, the third bracket 330 is elongated in the longitudinal direction of the vehicle body 1, and has a structure including at least one bent portion.

The third bracket 330 is connected to the lower flange 100b and to the side sill inner panel 102, and is fixed inside the side sill inner panel 102, as in the structure of the cross section D-D of FIG. 7 illustrated in FIG. 8.

In other words, the third bracket 330 has at least one bent portion to be disposed independently of the extrusion 200, and has one end connected to the lower flange mob and another end connected to the side sill inner panel 102, thereby defining four closed cross-sections together with the side sill 100, the extrusion 200, and the first bracket 310.

Accordingly, in this embodiment, through the structure of the side sill 100, the extrusion 200, and the connection bracket 300, more specifically, the first bracket 310 and the third bracket 330, the position of the extrusion 200 inside the side sill 100 is fixed and at the same time, four closed cross-sections are defined, thereby effectively solving the above-mentioned related art problems and securing side rigidity of the side sill 100 by the plurality of closed cross-sections.

Meanwhile, the first bracket 310, the second bracket 320, and the third bracket 330, as illustrated in FIGS. 9A and 9B, may correspond to the shape of the arrangement of the extrusion 200 and may be selectively connected in deformed shapes by symmetrically moving in the left and right or up and down directions.

In other words, as the shape of the arrangement of the extrusion 200 is changed, the position for the connection bracket 300 to be connected in the side sill 100 must also be changed. For this reason, as an example as illustrated in FIG. 9A, the positions of the first bracket 310 and the third bracket 330 may move symmetrically with respect to the above-described structure, and the connection positions of the second bracket 320 may also be symmetrically moved left and right to be fastened to the extrusion 200.

As another example, as illustrated in FIG. 9B, the connection bracket 300 may be vertically symmetrically moved from the state illustrated in FIG. 9A to be connected to the inside of the side sill 100 and fastened to the extrusion 200. In addition to the above mentioned examples, the connection bracket 300 may also move to various positions corresponding to the shape of the arrangement of the extrusion 200 to be connected to the inside of the side sill and be fastened to the extrusion 200.

In addition, due to reduction of the height of the extrusion 200 for the purpose of cost and weight optimization, the second bracket 320 may be deformable to additionally define at least one closed cross-section at a position corresponding to the first bracket 310 or to the third bracket 330, as illustrated in FIGS. 9C and 9D.

More specifically, the second bracket 320 does not have a multi-step structure when connected to the side sill reinforcement 106 and fastened to the upper portion of the extrusion 200 (see FIG. 3), but is selectively deformed into the same shape as the first bracket 310 and/or the third bracket 330 to define five closed cross-sections together with the side sill 100, the extrusion 200, the first bracket 310, and the third bracket 330, as in FIG. 9C.

Moreover, in order to secure the side rigidity of the side sill 100, the second bracket 320 may be divided into two second brackets 320 and 320' so that each is deformed into the same shape as the first bracket 310 or as the third bracket

330 to thereby define six closed cross-sections together with the side sill 100, the extrusion 200, the first bracket 310, and the third bracket 330, as in FIG. 9D.

As is apparent from the above description, the embodiments of the present invention provides the following effects.

In embodiments of the present invention, a plurality of connection brackets configured to fix an extrusion is mounted inside a side sill, and the plurality of connection brackets partition the inner portion of the side sill to define a plurality of closed cross-sections inside the side sill together with the side sill, thereby increasing the rigidity of a vehicle body and distributing the load transmitted to the extrusion in the event of collision.

In addition, the connection bracket is manufactured in the shape of '⊏' and is fastened to the extrusion inside the side sill to have a structure of a closed cross-section. For this reason, even if the height of the extrusion is relatively reduced, strong fixation may be achieved by the connection bracket, and accordingly, manufacturing cost may be reduced.

In the above, embodiments of the present invention have been described with reference to the accompanying drawings. However, those skilled in the art to which the present invention pertains will understand that various modifications may be made therefrom, and that all or part of the above-described embodiment(s) may be selectively combined. Therefore, the true technical protection scope of the present invention should be determined by the technical ideas of the appended claims.

What is claimed is:

1. A side sill reinforcement structure of a vehicle, the side sill reinforcement structure comprising:
    a side sill comprising a side sill inner panel, a side sill outer panel, and a side sill reinforcement, the side sill inner panel coupled to the side sill outer panel to define a first closed cross-section in a space between the side sill inner panel and the side sill outer panel;
    an extrusion inside the side sill, the extrusion defining a second closed cross-section; and
    a plurality of connection brackets inside the side sill, the plurality of connection brackets configured to fix the extrusion to define a plurality of third closed cross-sections inside the side sill with the side sill and the extrusion.

2. The side sill reinforcement structure of claim 1, wherein the plurality of connection brackets comprise:
    a first bracket connected to a lower flange, at which the side sill inner panel and the side sill reinforcement meet, and to the side sill reinforcement, and fastened to a lower portion of the extrusion;
    a second bracket connected to the side sill reinforcement and extending therefrom, and fastened to an upper portion of the extrusion; and
    a third bracket connected to the lower flange and to the side sill inner panel, and fixed inside the side sill inner panel.

3. The side sill reinforcement structure of claim 2, wherein the first bracket has a shape of '⊏', is fastened to the lower portion of the extrusion, and has one end connected to the lower flange and another end connected to the side sill reinforcement to define at least one of the plurality of third closed cross-sections.

4. The side sill reinforcement structure of claim 3, wherein the first bracket defines three of the plurality of third closed cross-sections with the side sill and the extrusion.

5. The side sill reinforcement structure of claim 2, wherein the third bracket has at least one bent portion to be disposed independently of the extrusion, and has one end connected to the lower flange and another end connected to the side sill inner panel to define one of the plurality of third closed cross-sections.

6. The side sill reinforcement structure of claim 2, wherein, due to reduction of a height of the extrusion, the second bracket is deformable to additionally define at least one of the plurality of third closed cross-sections at a position corresponding to the first bracket or to the third bracket.

7. The side sill reinforcement structure of claim 2, wherein the first to third brackets correspond to a shape of an arrangement of the extrusion and are selectively symmetrically moved in left and right or up and down directions to be connected in deformed shapes.

8. The side sill reinforcement structure of claim 1, wherein the first closed cross-section has a box structure.

9. The side sill reinforcement structure of claim 8, wherein the second closed cross-section has a partition structure.

10. A side sill reinforcement structure of a vehicle, the side sill reinforcement structure comprising:
    a side sill comprising a side sill inner panel, a side sill outer panel, and a side sill reinforcement installed in a space between the side sill inner panel and the side sill outer panel;
    an extrusion disposed inside the side sill and having a partition structure therein; and
    a plurality of connection brackets inside the side sill, the plurality of connection brackets affixing the extrusion inside the side sill and defining a plurality of closed cross-sections together with the side sill and the extrusion.

11. The side sill reinforcement structure of claim 10, wherein the plurality of connection brackets have different shapes, correspond to a shape of an arrangement of the extrusion, and are selectively symmetrically moved in left and right or up and down directions to be connected in deformed shapes.

12. The side sill reinforcement structure of claim 10, wherein the plurality of connection brackets define at least two or more closed cross-sections.

13. The side sill reinforcement structure of claim 10, wherein the plurality of connection brackets comprise:
    a first bracket connected to a lower flange, at which the side sill inner panel and the side sill reinforcement meet, and to the side sill reinforcement, and fastened to a lower portion of the extrusion;
    a second bracket connected to the side sill reinforcement and extending therefrom, and fastened to an upper portion of the extrusion; and
    a third bracket connected to the lower flange and to the side sill inner panel, and fixed inside the side sill inner panel.

14. The side sill reinforcement structure of claim 13, wherein the first bracket has a shape of '⊏', is fastened to the lower portion of the extrusion, and has one end connected to the lower flange and another end connected to the side sill reinforcement to define at least one of the plurality of closed cross-sections.

15. The side sill reinforcement structure of claim 13, wherein the third bracket has at least one bent portion to be disposed independently of the extrusion, and has one end connected to the lower flange and another end connected to the side sill inner panel to define one of the plurality of closed cross-sections.

16. The side sill reinforcement structure of claim 13, wherein the first bracket is welded to the side sill reinforcement and the lower flange.

17. The side sill reinforcement structure of claim 16, wherein the first bracket is fastened to the lower portion of the extrusion with a fastening member that extends through the first bracket and a lower wall of the extrusion.

18. The side sill reinforcement structure of claim 10, wherein the side sill inner panel and the side sill outer panel together have a box structure.

\* \* \* \* \*